of the formula:

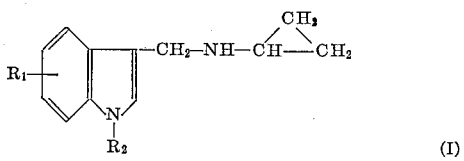

in which $R_1$ denotes a hydrogen atom or a chlorine atom or a methyl, benzyloxy or hydroxyl radical, and $R_2$ denotes a hydrogen atom or a methyl radical, their acid addition salts with inorganic and organic acids, and pharmaceutical compositions containing, in addition to an inert pharmaceutical carrier, a compound of the Formula I and/or an acid addition salt thereof. The substituent $R_1$ may be in any one of the 4-, 5-, 6- and 7-positions of the indole nucleus.

The compounds of the Formula I and their acid addition salts are produced by a process which comprises reducing an aldimine of the formula:

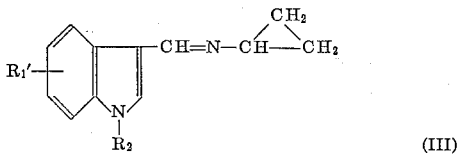

in which $R_1'$ denotes a hydrogen atom or a chlorine atom or a methyl or benzyloxy radical and $R_2$ denotes a hydrogen atom or a methyl radical, and when an acid addition salt is required, salifying the reduction product or a salt thereof with an inorganic or organic acid. The aldimine of Formula III may be produced by condensing an indole-(3)-aldehyde of the formula:

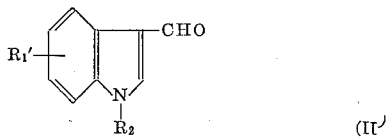

in which $R_1'$ and $R_2$ have the above significance, with cyclopropylamine.

One method of carrying out the process is as follows:

Condensation of the indole-(3)-aldehyde of the Formula II with cyclopropylamine is effected at room temperature by adding the reactants to one another, with or without a diluent or solvent; in order to ensure completeness of the reaction the reactants may be heated. No condensation agent is necessary. Separation of the aldimine of the Formula III is effected by evaporating the reaction mixture to reduce its volume and subsequently crystallizing the residue or, when the base fails to crystallize, converting it to a salt with an inorganic or organic acid.

The reduction of the aldimine of the Formula III to the end product of Formula I may be effected, for example, with catalytically activated hydrogen at room temperature and normal pressure. A metal of group 8 of the periodic system, e.g. platinum, Raney nickel or palladium (the preferred catalyst), is used as catalyst. The intermediate product of the Formula III may be hydrogenated either in the form of its free base or of a salt. Any benzyl radical present will at the same time be split off. The aldimine of the Formula III may also, however, be reduced with a complex alkali metal hydride, e.g. lithium aluminum hydride or sodium borohydride, in the usual solvents for these reducing agents, e.g. ether, tetrahydrofuran or dioxane. In this case, any benzyloxy radical present will remain in the molecule; if desired, it can subsequently be split off by catalytic hydrogenation or by acid hydrolysis, e.g. with hydrogen bromide in glacial acetic acid. It should be noted, however, that it is possible to use a method in which the aldimine of the Formula III is not isolated. The indole-(3)-aldehyde is mixed with a large excess of cyclopropylamine and the resulting, rapidly forming homogeneous solution is shaken, immediately or after brief heating, with or without the addition of an inert diluent (e.g. ethanol, methanol and ethyl acetate) with a noble metal catalyst and hydrogen. Isolation of the end product of Formula I may be effected by separating the catalyst and evaporating the solvent, whereupon the residue is purified by chromatography and/or crystallization and, if desired, by conversion into a salt with an inorganic or organic acid.

Those of the indole-(3)-aldehydes of Formula II above wherein the symbol $R_2$ denotes a hydrogen atom are known. The compounds of Formula II wherein $R_2$ represents the methyl radical are produced by reacting the corresponding indole devoid of a substituent in the 1-position with methyl iodide, the reaction being effected in liquid ammonia and in the presence of an alkali metal amide.

At room temperature, the compounds of Formula I are stable, usually crystalline, colorless substances. With inorganic and organic acids, they form crystalline, water-soluble acid addition salts which are stable at room temperature. Examples of acids suitable for forming acid addition salts with the compounds of Formula I are as follows: hydrochloric, hydrobromic, sulfuric, citric, tartaric, succinic, maleic, malic, acetic, benzoic, hexahydrobenzoic, methanesulfonic, fumaric, gallic and hydriodic acids. The free bases are difficultly soluble in water but they are readily or excellently soluble in the usual organic solvents. They give characteristic color reactions, the shade of which depends on the nature of the substituents $R_1$ and $R_2$, with Keller's reagent (glacial acetic acid which contains ferrous chloride and concentrated sulfuric acid) and Van Urk's reagent (p-dimethylaminobenzaldehyde and dilute sulfuric acid).

The compounds of Formula I have therapeutic activity and/or are intermediates for the production of pharmaceuticals and are strong reserpine antagonists, i.e. they are substances which are capable of inhibiting pharmacological effects of reserpine, especially its convulsion-promoting and central nervous system depressive action. In vitro they strongly inhibit monoamine oxidase and possess sympathicomimetic properties, e.g. mydriatic action (mouse) and positive inotropic and chronotropic effect (isolated atrial preparation, guinea pig). The toxicity of these compounds is relatively low. These properties are useful in the therapeutic treatment of psychic disorders, especially the depressive symptom cycle. The compounds of Formula I are preferably administered in the form of their water-soluble pharmaceutically acceptable salts.

The compounds and salts of the invention may be employed as pharmaceuticals as such, or in the form of appropriate medicinal compositions or preparations for oral, enteral or parenteral administration. In order to produce such medicinal preparations, the compounds of the invention are worked up with inorganic or organic adjuvants which are physiologically inert. Examples of such adjuvants or carriers for various medicinal preparations are as follows:

(1) Tablets and dragées: lactose, starch, talc and stearic acid.
(2) Syrups: solutions of cane sugar, invert sugar and glucose.
(3) Injectable solutions: water, physiologically acceptable alcohols, glycerine and physiologically acceptable vegetable fats.
(4) Suppositories: physiologically acceptable natural or hardened oils and waxes.

The compositions may contain any suitable preserving, stabilizing or wetting agents, solubilizers, sweetening and coloring substances or flavorings, so long as such are physiologically acceptable, in addition to a carrier and a therapeutically effective amount of at least one of the above indole derivatives.

In the following non-limitative examples, all temperatures are indicated in degrees centigrade; melting and boiling points are corrected.

*Example 1.—3-cyclopropylaminomethyl-indole*

A mixture of 0.5 g. of indole-(3)-aldehyde and 2.5 cc. of cyclopropylamine is left to stand for one hour at room temperature, then evaporated to dryness and the residue recrystallized from ether/petroleum ether.
Prisms of M.P. 128–129°.

A solution of 370 mg. of the resulting aldimine in 5 cc. of methanol is shaken with hydrogen and 180 mg. of a 5% palladium catalyst on aluminium oxide until 1 mol of hydrogen is consumed. It is then filtered and the filtrate evaporated to dryness. In order to convert it into the bioxalate, the residue is dissolved in 3 cc. of ethanol, 224 mg. of oxalic acid are added and dilution gradually effected with ether.
Prisms of M.P. 138–140°.
Keller's colour reaction: blue-grey, full intensity after ½–1 minute.
Van Urk's colour reaction: faint brown-pink.

*Example 2.—4-methyl-3-cyclopropylaminomethyl-indole*

4-methyl-indole-(3)-aldehyde is first produced from 4-methyl-indole, using dimethylformamide and phosphorus oxychloride; M.P. 192–194° from methanol/chloroform. A mixture of 10 g. of aldehyde and 30 cc. of cyclopropylamine is left to stand for 1 hour at room temperature, then evaporated to dryness and the residue chromatographed on 300 g. of aluminium oxide. The aldimine is washed into the filtrate with chloroform, whereas about 10% of unreacted aldehyde is eluted only with chloroform+½% ethanol. The aldimine in methanol/ether solution is converted as such into its bioxalate, M.P. 221–223°.

A solution of 288 mg. of the resulting aldimine bioxalate in 20 cc. of methanol is shaken with hydrogen and 100 mg. of 5% palladium catalyst on aluminium oxide until 1 mol of hydrogen has been consumed. It is then filtered, the filtrate evaporated to dryness and the residue crystallized from ethanol/ether.
Prisms of uncharacteristic M.P. 165–170°.
The substance begins to decompose, assuming an increasingly red colour, as from 145°.
Keller's colour reaction: blue with greenish tinge within approx. ½ minute.
Van Urk's colour reaction: faint brown-pink.

*Example 3.—4-hydroxy-3-cyclopropylaminomethyl-indole*

4-benzyloxy-indole-(3)-aldehyde is first produced from 4-benzyloxy-indole, using dimethylformamide and phosphorus oxychloride; M.P. 157–158°, from water. A mixture of 4.5 g. of aldehyde and 15 cc. of cyclopropylamine is left to stand for 30 minutes at room temperature, 15 cc. of benzene are then added and the mixture heated under reflux for 30 minutes. The crude aldimine obtained after evaporating the excess cyclopropylamine and benzene is converted as such into its bioxalate, M.P. 187°, from methanol/ether.

A solution of 760 mg. of the resulting aldimine bioxalate in 30 cc. of methanol is shaken with hydrogen and 300 mg. of 5% palladium catalyst on aluminium oxide until 2 mols of hydrogen have been consumed. It is then filtered, the filtrate evaporated to dryness and the residue crystallized from ethanol/ether.
Prisms of M.P. 147–148°.
Keller's colour reaction: green-blue, turning to grey-blue.
Van Urk's colour reaction: smoke coloured.

*Example 4.—6-hydroxy-3-cyclopropylaminomethyl-indole*

6-benzyloxy-indole-(3)-aldehyde is first produced from 6-benzyloxy-indole by means of dimethylformamide and phosphorus oxychloride; M.P. 214–216°, from ethyl acetate/petroleum ether. 3 g. of aldehyde and 10 cc. of cyclopropylamine are heated under reflux to boiling in 10 cc. of benzene for two hours. Evaporation to dryness is then effected and the residue shaken out between N hydrochloric acid and chloroform. The chloroform phase, which contains the aldimine hydrochloride is then separated, evaporated to dryness and the residue crystallized from chloroform/ether. Yellow prisms of M.P. 229–230°.

A solution of 2.8 g. of the resulting aldimine hydrochloride in 100 cc. of methanol is shaken with hydrogen and 1.4 g. of 5% palladium catalyst on aluminium oxide until 2 mols of hydrogen have been consumed. It is then filtered, the filtrate evaporated to dryness and the residue crystallized from ethanol/ether.
Prisms, having an indefinite M.P. at 105–115°, producing effervescence.
Keller's colour reaction: olive brown, full intensity after ½ to 1 minute.
Van Urk's colour reaction: green.

*Example 5.—7-methyl-3-cyclopropylaminomethyl-indole*

7-methyl-indole-(3)-aldehyde is first produced from 7-methyl-indole using dimethylformamide and phosphorus oxychloride; rodlets of M.P. 206–208°, from chloroform/ethyl acetate. A mixture of 4 g. of aldehyde and 11. cc. of cyclopropylamine is left to stand for 30 minutes at room temperature, 10 cc. of benzene then added, heated for a further 30 minutes to boiling under reflux, evaporated to dryness and the residue crystallized from benzene.
Prisms of M.P. 165–167°.

A solution of 2.65 g. of the resulting aldimine in 50 cc. of methanol is shaken with hydrogen and 1 g. of 5% palladium catalyst on aluminium oxide until 1 mol of hydrogen has been consumed. It is then filtered, the filtrate evaporated to dryness and the residue crystallized from benzene/petroleum ether.
Prisms of M.P. 104–107°.
Bioxalate: prisms from methanol/ether, non-characteristic melting point at approx. 140–150°, with decomposition; increasingly red colour as from approx. 110°.
Keller's colour reaction: blue with greenish tinge, full intensity after about ½ min.
Van Urk's colour reaction: faint yellow brown.

*Example 6.—1-methyl-3-cyclopropylaminomethyl-indole*

A mixture of 4.3 g. of 1-methyl-indole-(3)-aldehyde and 11 cc. of cyclopropylamine is left to stand for 30 minutes at room temperature. 10 cc. of benzene are then added, the mixture heated to boiling for a further 30 minutes under reflux, then evaporated to dryness and the crude aldimine crystallized from petroleum ether.
Prisms of M.P. 95–97°.

A solution of 2.53 g. of the resulting aldimine in 50 cc. of methanol is shaken with hydrogen and 1 g. of 5% palladium catalyst on aluminium oxide until 1 mol of hydrogen has been consumed, evaporated to dryness and the base converted as such into the bioxalate.

Prisms from ethanol/ether, noncharacteristic melting point at 140–150, with decomposition; increasingly red colour as from approx. 110°.

Keller's colour reaction: yellow green, full intensity after approx. 1 minute.

Van Urk's colour reaction: faint yellow brown.

*Example 7.—5-methyl-3-cyclopropylaminomethyl-indole*

The 5-methyl-indole-(3-)-aldehyde is first produced from 5-methyl-indole using dimethylformamide and phosphorus oxychloride; M.P. 145–147°, from water. A mixture of 2.5 g. of the crude aldehyde and 7 cc. of cyclopropylamine is left to stand for 30 minutes at room temperature, the homogeneous solution heat with 10 cc. of methanol for one hour under reflux and shaken with 1 g. of palladium catalyst and hydrogen, whereby 400 cc. of hydrogen are consumed over 30 minutes. Filtration is effected, the filtrate evaporated to dryness and the crude, oily 5-methyl-3-cyclopropylaminomethyl-indole converted as such into the bioxalate. Prisms from ethanol/ether, producing a red melt at 150–151°, resolidifying on further heating and finally melting above approx. 160°.

Keller's colour reaction: green-blue, full intensity after approx. ½ minute.

Van Urk's colour reaction: faint grey-violet.

*Example 8.—6-methyl-3-cyclopropylaminomethyl-indole*

6-methyl-indole-(3)-aldehyde is first produced from 6-methyl-indole with dimethylformamide and phosphorus oxychloride; M.P. 186–188°, from chloroform/methanol. 3 g. of 6-methyl-indole-(3)-aldehyde are dissolved in 20 cc. of cyclopropylamine, the solution maintained at room temperature for 30 minutes and at reflux temperature for one hour, 10 cc. of methanol and 1 g. of palladium catalyst on aluminium oxide are then added and shaken with hydrogen until 1 mol of hydrogen has been consumed. The catalyst is filtered off, the filtrate evaporated to dryness and the residue recrystallized from ethyl acetate. Prisms and rhombic plates of M.P. 119–121°.

Bioxalate: Needles from ethanol/ether which form a red melt at 142–143°, resolidifying and finally melting above approx. 160° (decomposition).

Keller's colour reaction: blue, full intensity after approximately ½ minute.

Van Urk's colour reaction: faint grey-violet.

*Example 9.—7-chloro-3-cyclopropylaminomethyl-indole*

7-chloro-indole-(3)-aldehyde is first produced from 7-chloro-indole by means of dimethylformamide and phosphorus oxychloride; needles of M.P. 181–182°, from ethyl acetate.

A solution of 3 g. of 7-chloro-indole-(3)-aldehyde in 20 cc. of cyclopropylamine is left to stand for one hour at room temperature, then diluted with 20 cc. of methanol, heated for 3 hours under reflux, the solution evaporated to dryness and the resulting aldimine crystallized from ether/petroleum ether. Prisms of M.P. 120–122°.

0.5 g. of sodium borohydride are added to a solution of 2.52 g. of aldimine in 20 cc. of absolute methanol, the clear solution left to stand for 45 minutes at room temperature and then shaken out between water and chloroform. The aqueous phase is rejected, the chloroform solution dried over potassium carbonate, the chloroform evaporated and the residue crystallized from ethyl acetate; massive prisms and plates of M.P. 102–103°. Bioxalate: Leaflets of M.P. 129–131° from ethanol/ether.

Keller's colour reaction: green, full intensity after approximately 1 minute.

Van Urk's colour reaction: faint yellowish.

What is claimed is:

1. An indole derivative selected from the group consisting of compounds of the formula:

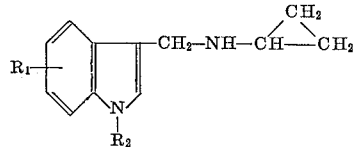

wherein $R_1$ is selected from the group consisting of hydrogen, chlorine, methyl, benzyloxy and hydroxy, and $R_2$ is selected from the group consisting of hydrogen and methyl, and therapeutically acceptable acid addition salts thereof.

2. 3-cyclopropylaminomethyl-indole.
3. 4-methyl-3-cyclopropylaminomethyl-indole.
4. 4-hydroxy-3-cyclopropylaminomethyl-indole.
5. 6-hydroxy-3-cyclopropylaminomethyl-indole.
6. 7-methyl-3-cyclopropylaminomethyl-indole.
7. 1-methyl-3-cyclopropylaminomethyl-indole.
8. 5-methyl-3-cyclopropylaminomethyl-indole.
9. 6-methyl-3-cyclopropylaminomethyl-indole.
10. 7-chloro-3-cyclopropylaminomethyl-indole.

References Cited by the Examiner

UNITED STATES PATENTS

| | | | |
|---|---|---|---|
| 2,708,197 | 5/55 | Speeter | 260—319 |
| 2,778,819 | 1/57 | Baumann et al. | 260—319 |
| 2,782,207 | 2/57 | Perkins et al. | 260—319 |
| 2,825,734 | 3/58 | Speeter | 260—319 |
| 2,870,162 | 1/59 | Speeter et al. | 260—319 |
| 2,955,973 | 10/60 | de Beer | 167—65 |
| 2,986,573 | 5/61 | Topliss et al. | 167—65 |

OTHER REFERENCES

Walker et al.: Jour. Org. Chem., volume 26, 1961, pages 432–439.

NICHOLAS S. RIZZO, *Primary Examiner.*